(12) United States Patent
Ichimei et al.

(10) Patent No.: US 10,890,788 B2
(45) Date of Patent: Jan. 12, 2021

(54) OPTICAL WAVEGUIDE DEVICE MODULE

(71) Applicant: Sumitomo Osaka Cement Co., Ltd., Tokyo (JP)

(72) Inventors: Hideki Ichimei, Tokyo (JP); Toshio Kataoka, Tokyo (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 16/364,449

(22) Filed: Mar. 26, 2019

(65) Prior Publication Data

US 2019/0302490 A1 Oct. 3, 2019

(30) Foreign Application Priority Data

Mar. 28, 2018 (JP) .................. 2018-061206

(51) Int. Cl.
*G02F 1/035* (2006.01)

(52) U.S. Cl.
CPC .......... *G02F 1/035* (2013.01); *G02F 2202/20* (2013.01)

(58) Field of Classification Search
CPC .............................. G02F 1/035; G02F 2202/20
See application file for complete search history.

(56) References Cited

U.S. PATENT DOCUMENTS

| | | | | |
|---|---|---|---|---|
| 9,335,570 B2* | 5/2016 | Katou | ................. | G02F 1/0121 |
| 9,366,825 B2* | 6/2016 | Takemura | ............. | G02F 1/0316 |
| 10,025,121 B2* | 7/2018 | Katou | ................. | G02F 1/0316 |
| 10,061,179 B2* | 8/2018 | Miyazaki | ............. | H04B 10/501 |
| 10,126,573 B2* | 11/2018 | Miyazaki | ................ | G02F 1/035 |
| 2011/0268382 A1 | 11/2011 | Takemura et al. | | |

* cited by examiner

*Primary Examiner* — Thomas A Hollweg
*Assistant Examiner* — Mary A El-Shammaa
(74) *Attorney, Agent, or Firm* — IpHorgan Ltd.

(57) ABSTRACT

An optical waveguide device module includes an optical waveguide device and a connection substrate provided outside the optical waveguide device, and these are housed in a housing. The optical waveguide device has a control electrode including a signal electrode and ground electrodes disposed to interpose the signal electrode between the ground electrodes. A signal line, ground lines disposed so as to interpose the signal line between the ground lines, and a back surface ground electrode disposed on a surface of the connection substrate are provided on the connection substrate. The ground line and the back surface ground electrode are electrically connected through a via hole passing through the connection substrate. Electrical connection means for electrically connecting the ground line and the ground electrode is provided. A connection portion of the electrical connection means on the ground line side is in the vicinity of the via hole of the ground line.

5 Claims, 6 Drawing Sheets

OPTICAL WAVEGUIDE DEVICE MODULE

BACKGROUND OF THE INVENTION

Field of the Invention

The present invention relates to an optical waveguide device module in which an optical waveguide device and a connection substrate are housed in a housing.

Description of Related Art

In the field of optical communication or optical measurement, an optical waveguide device having an optical waveguide formed on a substrate having an electro-optic effect is widely used for an optical modulator, an optical switch, and the like. The optical waveguide device is usually housed in a hermetically sealed housing to form an optical waveguide device module.

In the housing of the optical waveguide device module, a relay substrate for electrically connecting an input signal from the outside to a control electrode (a signal electrode and a ground electrode) of the optical waveguide device and a termination substrate, which is electrically connected to the output side of the control electrode of the optical waveguide device and terminates the propagated electric signal, are housed (refer to Japanese Patent No. 5263210). In this specification, the relay substrate and the termination substrate are collectively referred to as a connection substrate.

FIG. 1 is a diagram showing the schematic configuration of an optical waveguide device module. An optical waveguide device module 10 shown in FIG. 1 has a structure in which an optical waveguide device 12, a connection substrate 13 disposed in a side portion along the longitudinal direction of the optical waveguide device, and an optical component 14 disposed on the downstream side of the optical waveguide device in the light wave traveling direction are housed in a housing 11. In addition, an optical fiber F1 for light wave input and an optical fiber F2 for light wave output are connected to the housing 11.

FIG. 2 is a diagram for explaining a connection state between an optical waveguide device and a connection substrate in the related art, and is an enlarged view of a portion indicated by reference numeral A in FIG. 1. At the input and output ends of the control electrode of an optical waveguide device 12, ground electrodes 22 are disposed so as to interpose a signal electrode 21 between the ground electrodes 22. In addition, similarly to the control electrode, ground lines 32 are disposed on the connection substrate 13 so as to interpose a signal line 31 between ground lines 32. On the connection substrate 13, a back surface ground electrode (not shown) is further disposed on a surface (back surface) not facing the ground line. That is, the connection substrate 13 has a transmission line of a coplanar waveguide structure with a ground. The ground line 32 and a back surface ground electrode (not shown) are electrically connected to each other through a via hole 33 passing through the connection substrate 13. The diameter of the via hole is generally 80 μm to 250 μm.

In addition, the signal electrode 21 and the ground electrode 22 at the input and output ends of the control electrode and the signal line 31 and the ground line 32 of the connection substrate are electrically connected (wire-bonded) to each other by a wire 41, such as a gold wire. The wire 41 is wired so that the connection position on the optical waveguide device side and the connection substrate side is the same in the longitudinal direction (horizontal direction in the diagram) of the optical waveguide device. That is, the wire 41 is wired so as to extend in a direction perpendicular to the longitudinal direction of the optical waveguide device.

The interval between via holes is generally designed in consideration of the reflection component and the loss of the transmission line. However, a portion in which the electric field of the transmission line is different from the designed value is present in a portion without a via hole (for example, an end of the connection substrate). This causes degradation of the transmission line characteristic depending on the connection position of the wire bonding.

SUMMARY OF THE INVENTION

In order to solve the aforementioned problem, it is an object of the invention to provide an optical waveguide device module having an improved transmission line characteristic at a connection portion between an optical waveguide device and a connection substrate.

In order to solve the aforementioned problem, an optical waveguide device module of the invention has the following technical features.

(1) An optical waveguide device module includes: an optical waveguide device having a substrate having an electro-optic effect, an optical waveguide formed on the substrate, and a control electrode for controlling a light wave propagating through the optical waveguide; and a connection substrate that is provided outside the optical waveguide device and has a wiring electrically connected to the control electrode. The optical waveguide device and the connection substrate are housed in a housing. The control electrode includes a signal electrode and a ground electrode disposed so as to interpose the signal electrode. A signal line, a ground line disposed so as to interpose the signal line, and a back surface ground electrode disposed on a surface of the connection substrate on a side opposite to the ground line are provided on the connection substrate. The ground line and the back surface ground electrode are electrically connected to each other through a via hole passing through the connection substrate. Electrical connection means for electrically connecting the ground line and the ground electrode to each other is provided. A connection portion of the electrical connection means on the ground line side is in the vicinity of the via hole of the ground line or on a conductive material filled in the via hole.

(2) In the optical waveguide device module described in the above-described (1), the connection portion of the electrical connection means on the ground line side is located closer to the via hole than an edge of the connection substrate on the optical waveguide device side.

(3) In the optical waveguide device module described in the above-described (1) or (2), the connection portion of the electrical connection means on the ground line side is located on a straight line connecting the via hole and a connection portion of the electrical connection means on the ground electrode side to each other.

(4) In the optical waveguide device module described in any one of the above-described (1) to (3), the ground electrode has a small interval portion, in which an interval between ground electrodes is smaller than that at an input end or an output end of the control electrode, at a position away from the input end or the output end, and has a connection portion of the electrical connection means on the ground electrode side in the small interval portion.

(5) In the optical waveguide device module described in any one of the above-described (1) to (4), the connection portion of the electrical connection means on the ground line side is located at a position where a distance from an end of the via hole is 1.2 times or less a diameter of the via hole.

According to the invention, since the connection portion of the electrical connection means on the ground line side for electrically connecting the ground line and the ground electrode to each other is the vicinity of the via hole, which passes through the connection substrate and which electrically connects the ground line and the back surface ground electrode to each other, or the conductive material filled in the via hole, it is possible to improve the transmission line characteristic at the connection portion between the optical waveguide device and the connection substrate.

DETAILED DESCRIPTION OF THE INVENTION

An optical waveguide device module according to the invention will be described in detail using preferred examples. In addition, the invention is not limited by the following examples.

Figure 1:
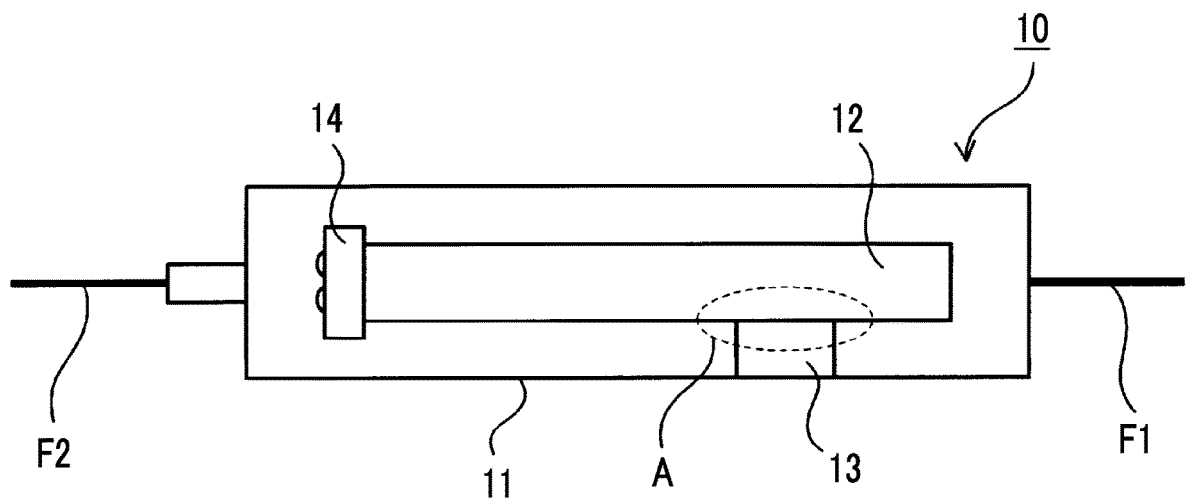
FIG. 1 is a diagram showing the schematic configuration of an optical waveguide device module in the related art.
Figure 2:
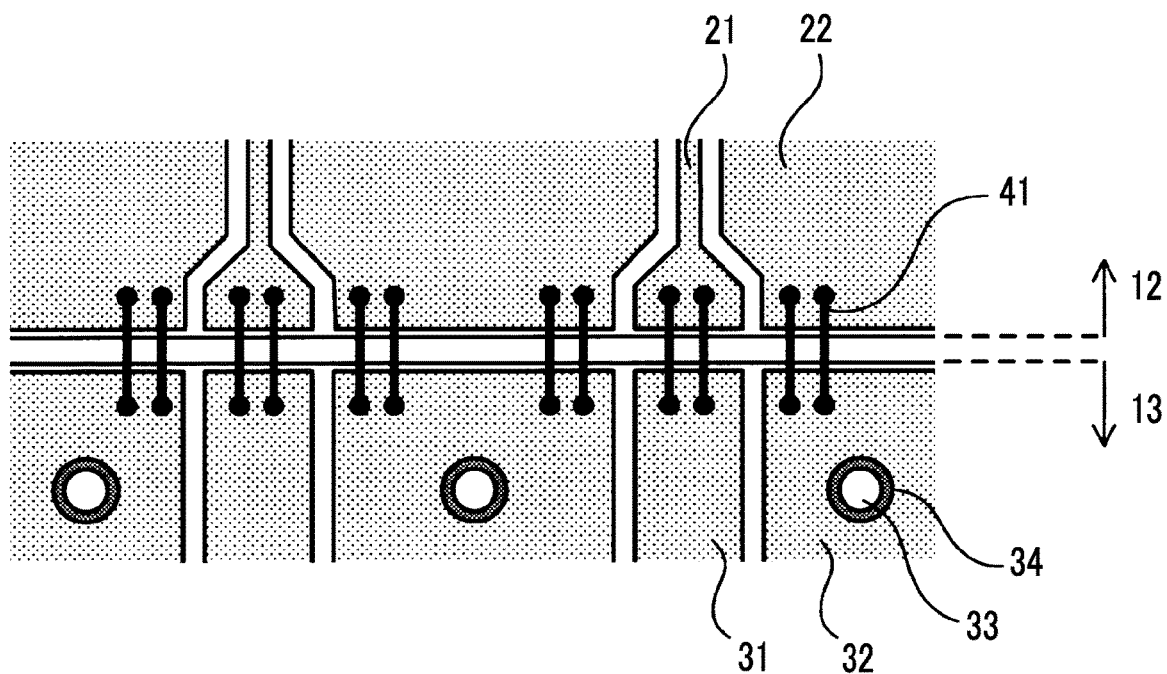
FIG. 2 is a diagram for explaining a connection state between an optical waveguide device and a connection substrate in the related art.
Figure 3:
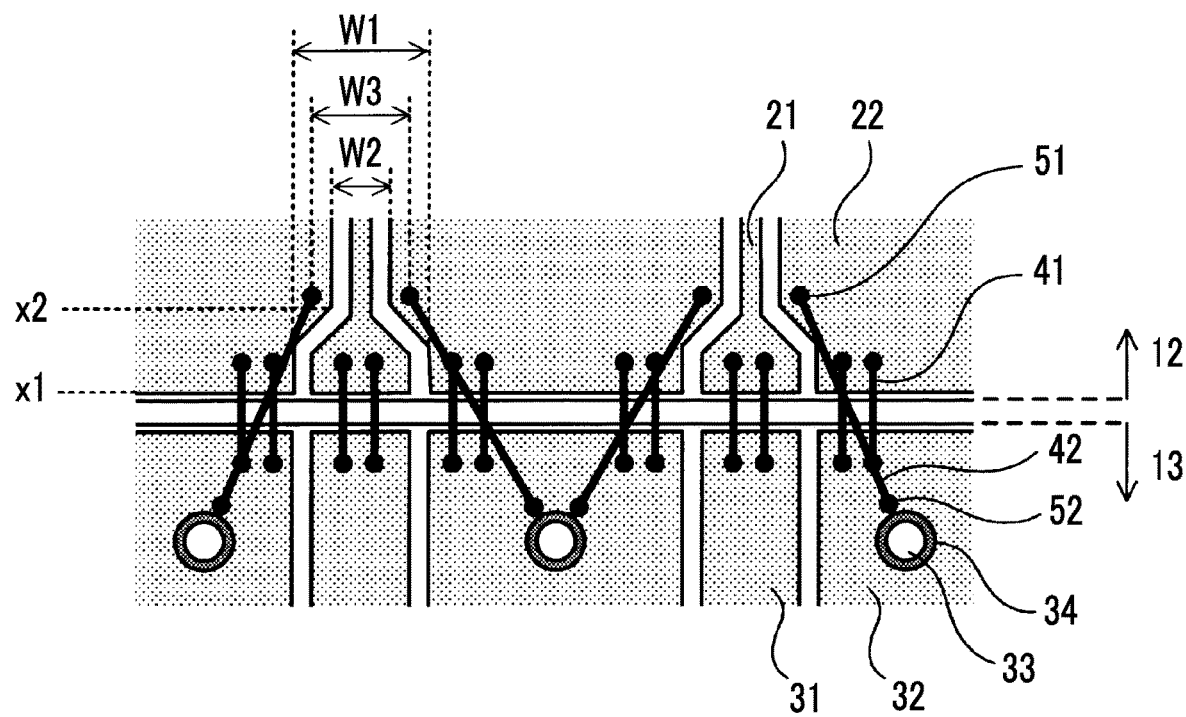
FIG. 3 is a diagram for explaining a connection state between an optical waveguide device and a connection substrate according to a first embodiment of the invention.
Figure 4:
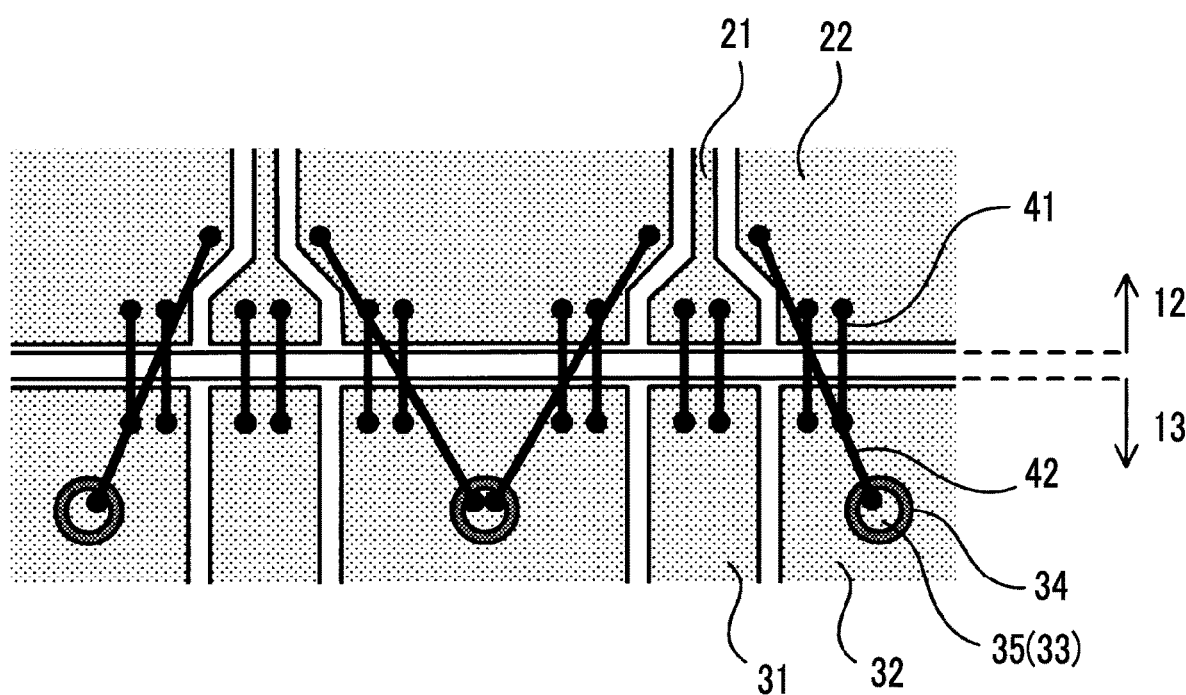
FIG. 4 is a diagram for explaining a connection state between an optical waveguide device and a connection substrate according to a second embodiment of the invention.
Figure 5:
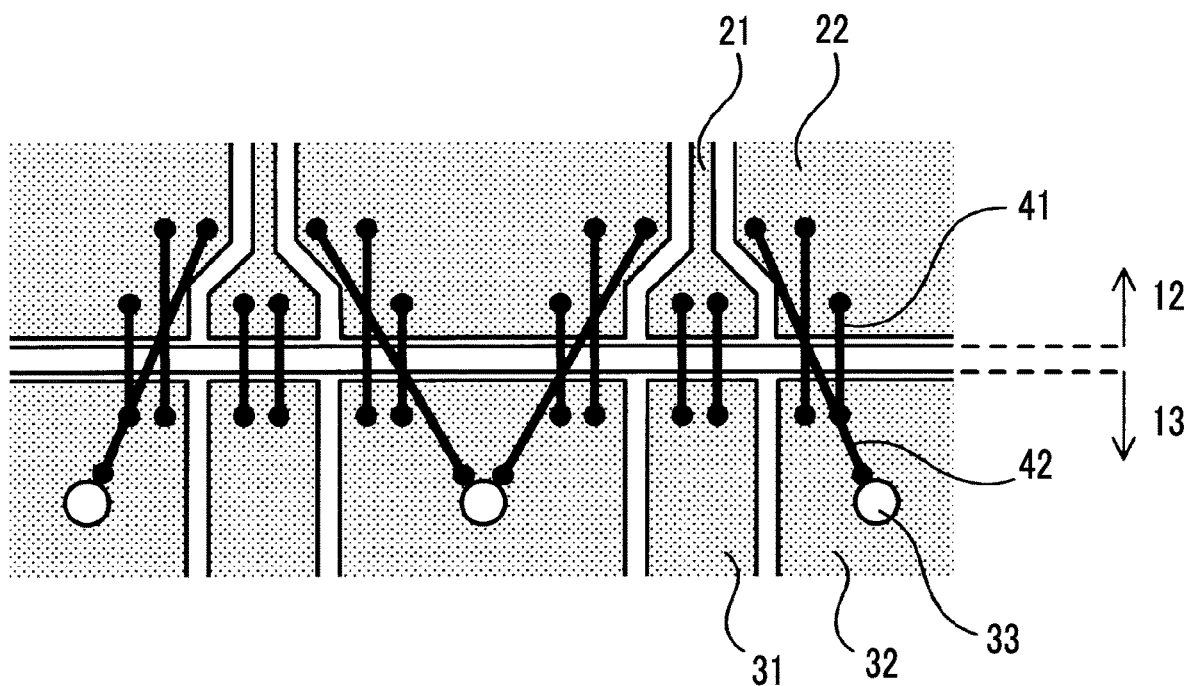
FIG. 5 is a diagram for explaining a connection state between an optical waveguide device and a connection substrate according to a third embodiment of the invention.

As shown in FIG. 1, the optical waveguide device module of the invention is the optical waveguide device module 10 including: the optical waveguide device 12 having a substrate having an electro-optic effect, an optical waveguide formed on the substrate, and a control electrode for controlling a light wave propagating through the optical waveguide; and the connection substrate 13 that is provided outside the optical waveguide device and has a wiring electrically connected to the control electrode. The optical waveguide device and the connection substrate are housed in the housing 11. Then, as shown in FIGS. 3 to 5, the optical waveguide device module of the invention is characterized in that the control electrode includes the signal electrode 21 and the ground electrode 22 disposed so as to interpose the signal electrode 21, the signal line 31, the ground line 32 disposed so as to interpose the signal line 31, and a back surface ground electrode (not shown) disposed on a surface of the connection substrate on a side opposite to the ground line are provided on the connection substrate, the ground line and the back surface ground electrode are electrically connected through the via hole 33 passing through the connection substrate, electrical connection means 42 for electrically connecting the ground line and the ground electrode to each other is provided, and a connection portion of the electrical connection means on the ground line side is in the vicinity of the via hole of the ground line (or on a conductive material 35 filled in the via hole).

As a substrate having an electro-optic effect, in particular, any single crystal of $LiNbO_3$, $LiTaO_5$, lead lanthanum zirconate titanate (PLZT), and Si or a compound semiconductor material, such as InP or GaAs, can be appropriately used. In particular, $LiNbO_3$ and $LiTaO_5$ that are frequently used in optical modulators are preferable.

An optical waveguide to be formed on a substrate is formed by thermally diffusing a high refractive index material, such as titanium (Ti), on the $LiNbO_3$ substrate (LN substrate), for example. In addition, it is also possible to form a ridge optical waveguide by forming a groove on the side surface of the optical waveguide or by forming the optical waveguide portion thicker than the other substrate portion.

The control electrode includes a signal electrode or a ground electrode, and can be formed by forming a base electrode pattern of Ti or the like on the substrate surface and performing gold plating or the like on the substrate surface. In addition, it is also possible to provide a buffer layer, such as dielectric $SiO_2$, on the substrate surface after forming the optical waveguide as necessary.

In the invention, the "connection substrate" means a relay substrate that connects an input terminal, to which an electric signal is input from the outside of the housing, and a signal input port of the optical waveguide device to each other, a termination substrate that is connected to the output end of the signal electrode of the optical waveguide device and terminates an electric signal by a resistor or the like in order to suppress the reflection of the electric signal. As a substrate material of the connection substrate, a material having a dielectric constant lower than that of the substrate material of the optical waveguide device, for example, alumina or a semiconductor material is used. This is to contribute to widening the bandwidth of the optical waveguide device.

A transmission line including a signal line and a ground line disposed so as to interpose the signal line is formed on one surface (front surface) of the connection substrate, and a back surface ground electrode is formed on a surface (back surface) of the connection substrate opposite to the one surface. The ground line and the back surface ground electrode are electrically connected to each other through a via hole provided so as to pass through the connection substrate. In addition, the via hole may be filled with a conductive material having conductivity, such as silver paste.

As electrical connection means for electrically connecting the optical waveguide device and the connection substrate to each other, a conductive wire, such as gold, or a wide ribbon wire can be used. The number of conductive wires or ribbon wires is not limited to one, and it is also possible to connect the vicinity of the same place with a plurality of conductive wires or ribbon wires. Hereinafter, a case where a conductive wire is used as the electrical connection means will be described as an example.

The main feature of the invention is to have a wire connected to the vicinity of the via hole as electrical connection means between the optical waveguide device and the connection substrate. With such a configuration, it is possible to suppress the degradation of the transmission line characteristic at a connection portion between the optical waveguide device and the connection substrate. Hereinafter, the invention will be specifically described with reference to embodiments.

FIG. 3 is a diagram for explaining a connection state between an optical waveguide device and a connection substrate according to a first embodiment.

In the first embodiment, a wire 42 that electrically connects the ground electrode 22 and the ground line 32 to each other and is connected to the vicinity of the via hole 33 is provided. A connection portion 52 of the wire 42 on the ground line side is located closer to the via hole 33 than the edge of the connection substrate 13 on the optical waveguide device side, and is located on a straight line connecting the via hole 33 and a connection portion 51 of the wire 42 on the ground electrode side to each other.

Figure 7:
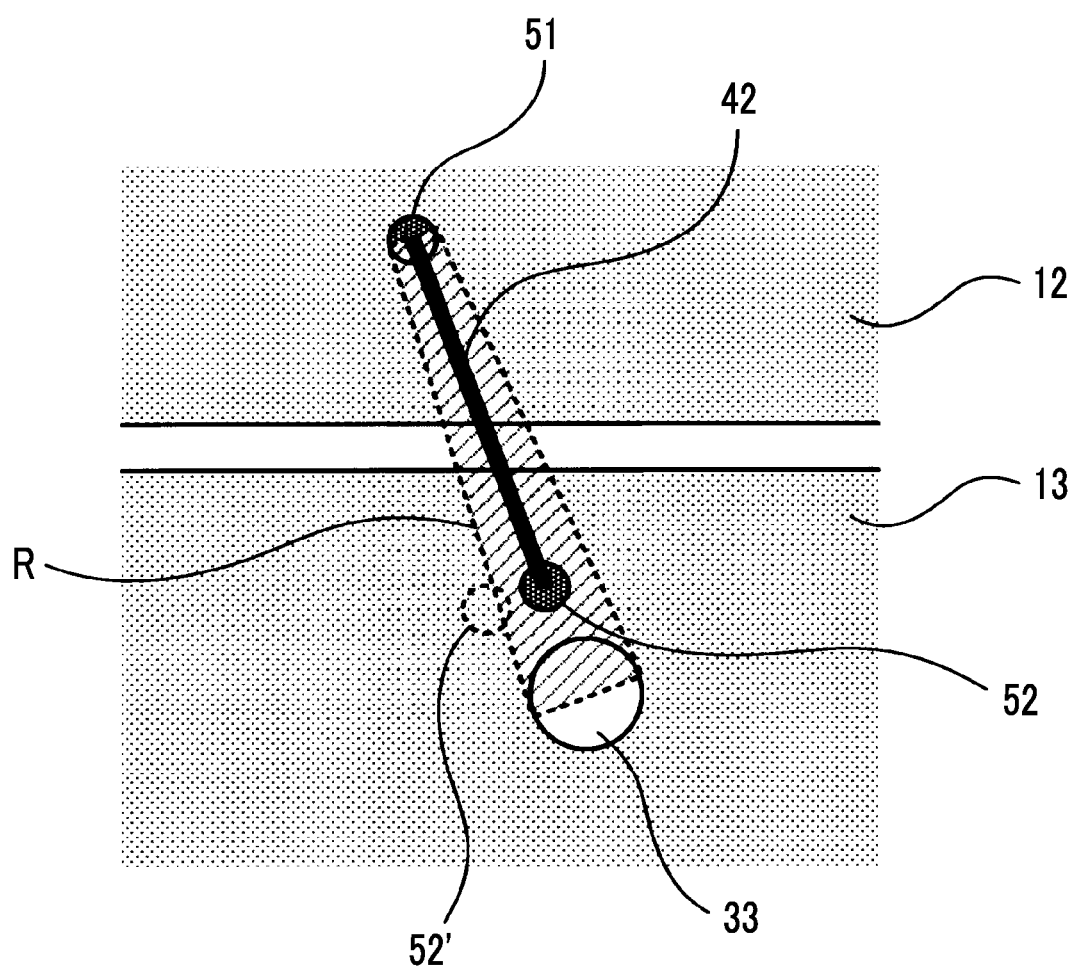
FIG. 7 is a diagram for explaining a position of a connection portion of a wire on a ground line side.

Here, the straight line connecting the via hole and the connection portion of the wire on the ground electrode side to each other has a width corresponding to the size of the via hole or the connection portion. That is, as shown in FIG. 7, an area R formed by tangent lines drawn between the via hole 33 and the connection portion 51 of the wire 42 on the ground electrode side corresponds to the straight line described above. In addition, "the connection portion of the wire on the ground electrode side is located on the straight line connecting the via hole and the connection portion of the wire on the ground electrode side to each other" means not only a state in which the entire connection portion is formed in the area R but also a state in which at least a part of the connection portion is formed in the area R (state indicated by a broken line 52').

However, from the viewpoint of suppressing the degradation of the transmission line characteristic, the configuration in which the entire connection portion is formed in the area R is more preferable than the configuration in which a part of the connection portion is formed in the area R.

Figure 8:
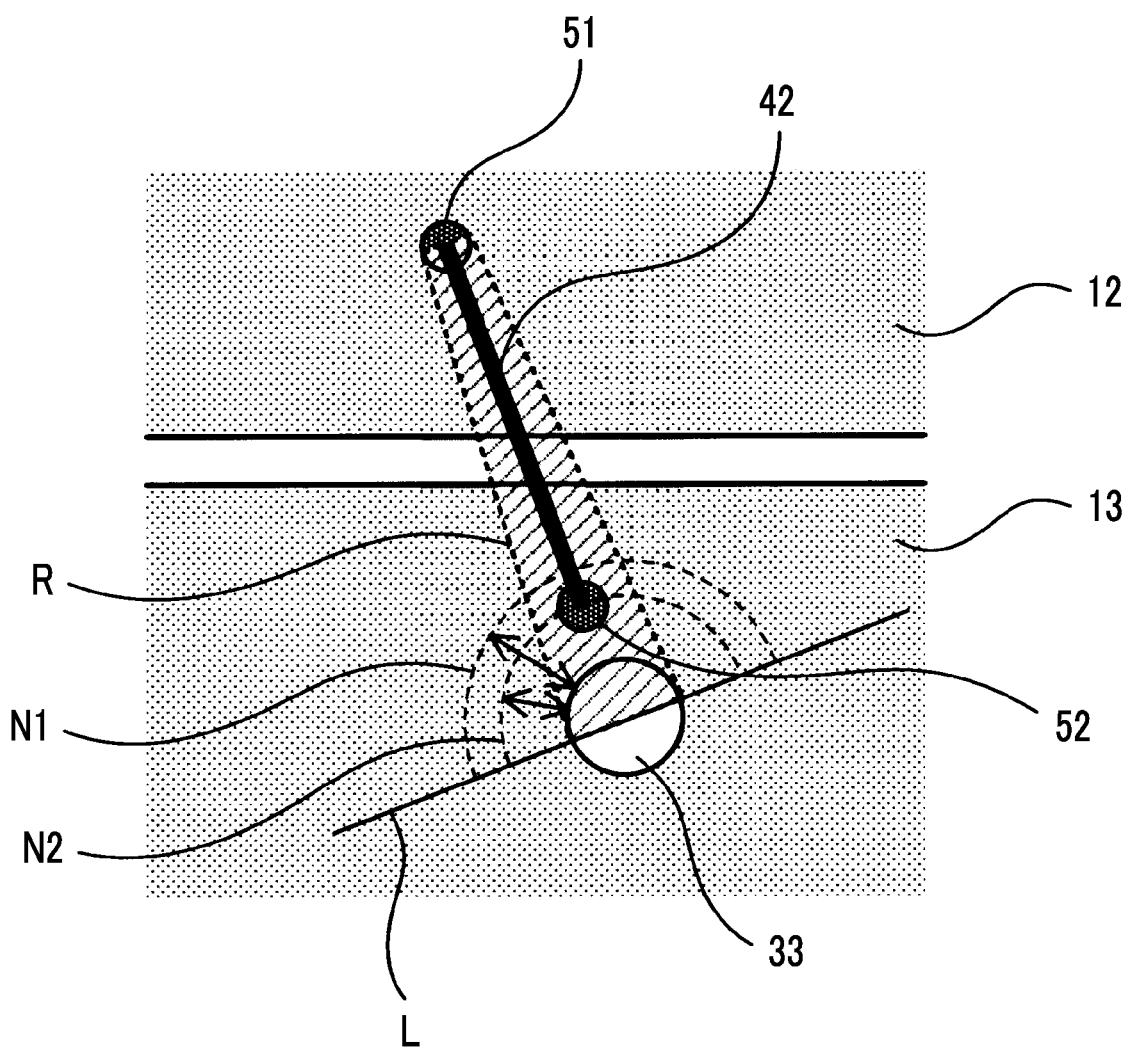
FIG. 8 is a diagram for explaining a position of a connection portion of a wire on a ground line side.

As will be described later with reference to FIG. 6, the connection portion of the wire on the ground line side improves the effect of suppressing the degradation of the transmission line characteristic in a case where the connection portion of the wire on the ground line side is closer to the via hole. As shown in FIG. 8, the connection portion of the wire on the ground line side is preferably provided in a region N1 whose distance from the outer periphery of the via hole is 1.2 times or less the diameter of the via hole. More preferably, the connection portion of the wire on the ground line side is provided in a region N2 whose distance from the outer periphery of the via hole is 0.8 times or less the diameter of the via hole. However, in a case where the wire is connected to a position opposite to the ground electrode (lower side of a line segment L) even though the position is a position satisfying the above-described distance conditions regarding the via hole, the effect of suppressing the degradation of the transmission line characteristic cannot be expected much. Therefore, the connection portion of the wire on the ground line side is preferably provided at a position on the ground electrode side (upper side of the line segment L), which is a position satisfying the above-described distance conditions regarding the via hole. More preferably, the connection portion is provided in the area R. In addition, the vicinity of the via hole does not necessarily need to be within the range of the region N1, and any distance from the outer periphery of the via hole may be applied as long as the effect of suppressing the degradation of the transmission line characteristic is obtained.

In addition, in the first embodiment, since the outer periphery of the via hole 33 is surrounded by a guard pattern 34, the connection portion 52 for wire bonding is formed outside the guard pattern 34 and as close as possible to the guard pattern 34. The guard pattern 34 is formed of chromium or the like, and is provided for stopping the flow of a filling material at the time of filling a filling material, for example, a silver paste that is a conductive material, in the via hole.

The ground electrode 22 has a small interval portion, in which an interval between ground electrodes is smaller than that at the input end or the output end, at a position away from the input end or the output end of the control electrode, and has the connection portion 51 of the wire 42 on the ground electrode side in the portion.

More specifically, the control electrode of the optical waveguide device has an interval W1 between the ground electrodes at a position x1 (position of the input end or the output end) close to the edge on the connection substrate side. In addition, an interval W2 between the ground electrodes at a position x2 away from the edge on the connection substrate side is smaller than the interval W1 at the position x1. The position x2 is the routing start position of the control electrode (signal electrode). Usually, the impedance at this position is set to a desired value in consideration of the reflection component and the loss of the transmission line. The connection portion 51 of the wire 42 on the ground electrode side is formed in a portion close to the routing start position of the control electrode. In addition, two wires 42 are formed with the signal electrode 21 interposed between the two wires 42, and an interval W3 between connection portions of the two wires on the ground electrode side is set to W2 or more and W1 or less. In this case, the positions of the connection portions of the two wires on the side of the ground electrode may be positions closer to the edge on the connection substrate 13 side than the position x2, or may be positions far from the edge.

Thus, in the first embodiment, in the wire for electrically connecting the ground line of the connection substrate and the ground electrode of the optical waveguide device to each other, an end on the connection substrate side is connected to the vicinity of the via hole connected to the back surface ground electrode and an end on the optical waveguide device side is connected to the vicinity of the routing start position of the control electrode. That is, the back surface ground electrode of the connection substrate and the routing start position of the control electrode of the optical waveguide device are electrically connected to each other at the shortest distance. According to such a structure, it is possible to suppress the degradation of the transmission line characteristic at a connection portion between the optical waveguide device and the connection substrate.

Here, FIG. 3 shows a configuration in which the interval W3 between the connection portions of the two wires on the ground electrode side is W2 or more and W1 or less, but the invention is not limited to such a configuration. However, with such a configuration, it is possible to more effectively suppress the degradation of the transmission line characteristic at a connection portion between the optical waveguide device and the connection substrate. In addition, although the two wires are connected line-symmetrically to each other with the signal electrode interposed between the two wires in FIG. 3, the two wires do not need to be connected line-symmetrically to each other and may be connected to each other within a range where the effect of the invention is obtained.

In addition, in a case where one ground line is connected to the back surface ground electrode with a plurality of via holes, it is preferable to connect the wire for the ground line in the vicinity of the via hole closest to the routing start position of the control electrode. In addition, in a case where there are a plurality of via holes closest to the routing start position of the control electrode, it is preferable to connect the wire to the vicinity of the via hole closest to the signal line. In addition, although one wire is connected to the vicinity of each via hole in the diagram, a plurality of wires may be connected to the vicinity of a single via hole.

FIG. 4 is a diagram for explaining a connection state between an optical waveguide device and a connection substrate according to a second embodiment, and FIG. 5 is a diagram for explaining a connection state between an optical waveguide device and a connection substrate according to a third embodiment.

In the second embodiment (FIG. 4), the via hole 33 is filled with the conductive material 35 having conductivity, and the wire 42 is connected to the conductive material 35. With such a configuration, since the connection portion on the ground line side can be brought closer to the via hole, degradation of the transmission line characteristic at the connection portion between the optical waveguide device and the connection substrate can be suppressed more effectively than in the configuration shown in FIG. 3.

In the third embodiment (FIG. 5), the guard pattern 34 is not provided around the via hole 33, and the wire 42 is connected to the position outside the via hole 33 and as close as possible to the via hole 33. Even with such a structure, since the connection portion on the ground line side can be brought closer to the via hole as much as the absence of a guard pattern, degradation of the transmission line characteristic at the connection portion between the optical waveguide device and the connection substrate can be suppressed more effectively than in the configuration shown in FIG. 3. However, in the case of using the configuration of the third embodiment, it is more preferable to prevent the connection portion on the ground line side from being stuck to the via hole since a reduction in the connection strength of the connection portion can be prevented.

Figure 6:
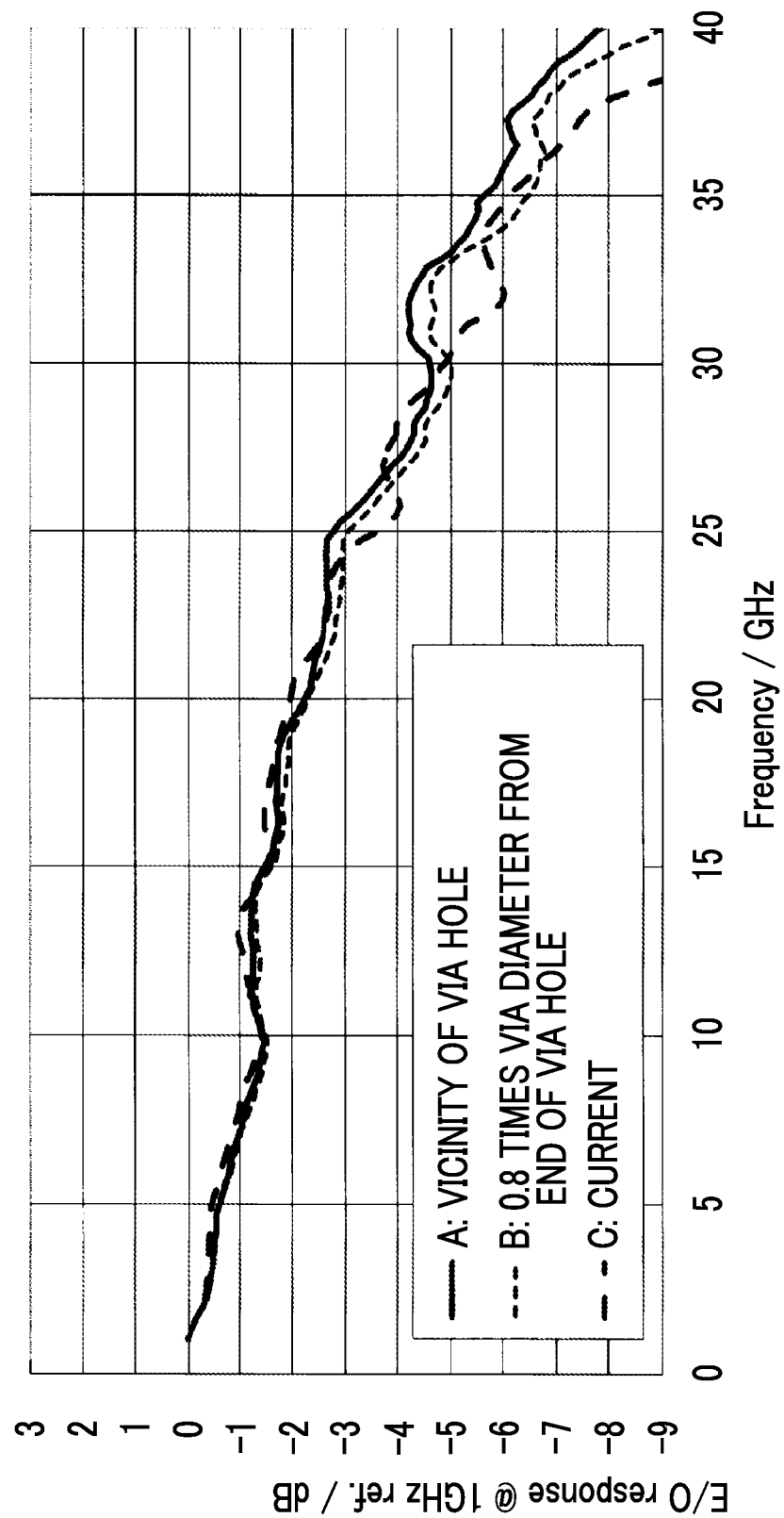
FIG. 6 is a diagram for explaining the effect of improving the transmission line characteristic according to the invention.

FIG. 6 is a diagram for explaining the effect of improving the transmission line characteristic according to the invention. From the graph shown in FIG. 6, it is understood that by applying the invention, the characteristics of the optical waveguide device module are improved over the entire frequency band, in particular, in the high frequency region from 25 GHz to 35 GHz. In addition, in FIG. 6, the optical band characteristic (−3 dB) is about 25.3 GHz in the case of a configuration (A) in which the wire is connected to the vicinity of the via hole, about 24.8 GHz in the case of a configuration (B) in which the wire is connected to a position 0.8 times the diameter of the via hole (via diameter) from the end of the via hole, and about 24.3 GHz in the case of a configuration in the related art (C) in which no wire is connected near the via hole.

While the invention has been described based on the embodiments, the invention is not limited to the content described above, and it is possible to change the design appropriately without departing from the gist of the invention.

According to the invention, it is possible to provide an optical waveguide device module having an improved transmission line characteristic at a connection portion between an optical waveguide device and a connection substrate.

What is claimed is:

1. An optical waveguide device module, comprising:
an optical waveguide device having a substrate having an electro-optic effect, an optical waveguide formed on the substrate, and a control electrode for controlling a light wave propagating through the optical waveguide; and
a connection substrate that is provided outside the optical waveguide device and has a wiring electrically connected to the control electrode,
wherein the optical waveguide device and the connection substrate are housed in a housing,
the control electrode includes a signal electrode and ground electrodes disposed so as to interpose the signal electrode between the ground electrodes,
a signal line, ground lines disposed so as to interpose the signal line between the ground lines, and a back surface ground electrode disposed on a surface of the connection substrate on a side opposite to the ground lines are provided on the connection substrate,
the ground lines and the back surface ground electrode are electrically connected to each other through a via hole piercing through the connection substrate,
electrical connection means for electrically connecting the ground lines and the ground electrodes to each other is provided, and
a connection portion of the electrical connection means on the ground line side is located in the vicinity of the via hole of the ground lines or on a conductive material filled in the via hole.

2. The optical waveguide device module according to claim 1, wherein the connection portion of the electrical connection means on the ground line side is located closer to the via hole than an edge of the connection substrate on the optical waveguide device side.

3. The optical waveguide device module according to claim 1, wherein the connection portion of the electrical connection means on the ground line side is located on a straight line connecting the via hole and a connection portion of the electrical connection means on the ground electrode side to each other.

4. The optical waveguide device module according to claim 1, wherein the ground electrodes has a small interval portion, in which an interval between the ground electrodes is smaller than that at an input end or an output end of the control electrode, at a position away from the input end or the output end, and has a connection portion of the electrical connection means on the ground electrode side in the small interval portion.

5. The optical waveguide device module according to claim 1, wherein the connection portion of the electrical connection means on the ground line side is located at a position where a distance from an end of the via hole is 1.2 times or less a diameter of the via hole.

* * * * *